United States Patent Office 3,466,371
Patented Sept. 9, 1969

3,466,371
1,2α-METHYLENE-STEROIDS AND PROCESS
FOR THEIR PRODUCTION
Rudolf Wiechert and Friedmund Neumann, Berlin, Germany, assignors to Schering AG, Berlin, Germany
No Drawing. Filed Nov. 7, 1966, Ser. No. 592,669
Claims priority, application Germany, Nov. 9, 1965,
Sch 37,994
Int. Cl. A61k 27/00; C07c 169/32
U.S. Cl. 424—240
9 Claims

ABSTRACT OF THE DISCLOSURE

A compound of the formula:

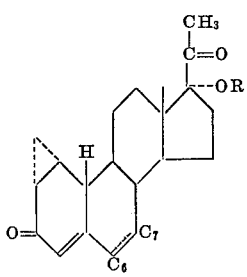

wherein R represents a member selected from the group consisting of hydrogen and acyl and

represents a single or a double bond.

The compounds have an outstanding progestational action and are useful in the treatment of gynecological disorders.

The present invention relates to new pharmaceutically effective compounds of the steroid group and a process for their production. More particularly, the present invention relates to 1,2α-methylene-steroids having the following general formula:

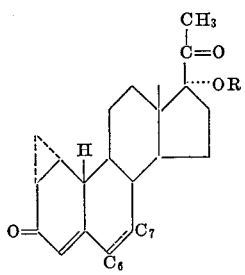

wherein R is hydrogen or an unsubstituted or substituted acyl-group, preferably having from 1–11 carbon atoms, and wherein

denotes a single or a double bond. The acyl-group can be a member of the branched or unbranched fatty acids, such as acetic acid, propionic acid, butyric acid, caproic acid, carpic acid, oenanthic acid, undecylic acid, and the like. As substituted acyl-groups, there may be used aryl, as, for instance, phenyl; cycloalkyl, as, for instance, cyclopentyl; halo, such as, chloro-bromo-iodo; amino- and hydroxy-derivatives of the aforementioned acyl-radicals, such as phenyl-acetic acid, cyclopentyl-propionic acid, halo, as, for example, chloro- bromo- acetic acid, amino acetic acid, hydroxy-propionic-acid, and the like.

The new 1,2α-methylene-steroids can be prepared from compounds of the following general formula:

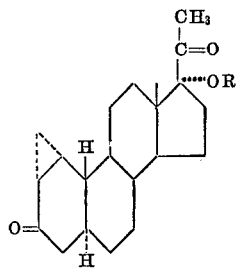

wherein R has the same meaning as given above. Starting materials of the aforesaid type are dehydrogenated to form the 4,5 and optionally the 6,7-double-bond, whereby the two double-bonds may be introduced simultaneously or stepwise. Additionally, the starting materials are saponified, esterified or reesterified in the 17α-position. Thereafter, the desired R group is obtained in that a free 17α-hydroxy-group may be esterified or a 17α-acyloxy group may be saponified and the obtained free 17α-hydroxyl-group optionally replaced by another acyloxy-group (reesterification).

The 4,5-double-bond, for instance, can be introduced by dehydrogenation with selenium dioxide. Preferably, the reaction is performed in alcoholic solution and more preferably in tert.-butanol at the boiling point of the resulting solution. Furthermore, it is expedient to add to the reaction medium an effective amount of pyridine or an acid, preferably glacial acetic acid.

Another possibility of dehydrogenating according to the present invention is the reaction of the 5α-H-3-ketone with 2,3-dichloro-5,6-dicyan - benzoquinone. According to the amount of the dehydrogenation agent used, the reaction conditions, and the reaction medium either a 4,5-double bond alone or simultaneously also a 6,7-double bond may be introduced. Using a slight excess of 2,3-dichloro-5,6-dicyan-benzoquinone and a neutral solvent such as benzene, toluene, dioxan, tert.-butanol, tert.-amyl alcohol, tetrahydrofuran, acetone, acetic acid ester, or the like, the corresponding $\Delta^4$-unsaturated steroid is obtained. With a large excess of the reducing agent and optionally in the presence of a weak acid such as p-nitrophenol or even in the presence of a strong acid such as p-toluenesulfonic acid the corresponding $\Delta^{4,6}$-unsaturated compound is produced; the addition of an acid is unnecessary if extended reaction times are put up with. The reaction times usually are between about 5 and 48 hours, depending on the solvent used. The reaction time is further shortened with increasing temperatures. Preferred reaction temperatures are therefore the boiling points of the solvents or, more definitely, those of the reaction medium formed by the solvent and the reaction components.

Besides the direct dehydrogenation for introducing the 4,5-double bond, a multi-step-process is particularly advantageous. According to this multi-step process by methods which are known per se, the 1,2α-methylene-$\Delta^3$-3-enol-acetate is made from the corresponding 1,2α-methylene-3-ketone. This can be achieved, for instance, by boiling the ketone with iso-propenyl-acetate in the presence of p-toluenesulfonic acid in benzene solution, whereby a free 17α-hydroxyl group is partially acetylated. Thereafter on the $\Delta^3$-double bond chlorine or bromine is added and then in a manner known per se, from the primarily obtained 1,2α - methylene - 4 - halo-3-ketone, the corresponding hydrogen chloride is split off. For splitting off the hydrogen chloride, the α-halo-ketone, for example, can be heated with calcium carbonate and lithium bromide in dimethylformamide under exclusion of oxygen and in the presence of an inert gas, such as nitrogen.

The result of these reaction steps with regard to the 5α-H-steroids, the so-called allo-group having the A and B carbon rings in trans-configuration, is new and surprising. Normally, 5α-H-3-ketones are enolized on the C–2 atom and correspondingly also brominated on the C–2 atom. In the present process, however, a hydrogen of the C–4 atom is substituted by bromine thereby obtaining a $\Delta^4$-double bond on splitting off hydrogen bromide.

After the formation of the $\Delta^4$-double bond, another dehydrogenation can be performed for introducing the additional 6,7-double bond. Its dehydrogenating agent in this case besides 2,3-dichloro-5,6-dicyan-benzoquinone chloranil (tetrachloro-p-benzoquinone) can be used also. With chloranil, solvents such as dioxan or sec. or tert. alcohols are suitable.

The new steroids according to the present invention are valuable pharmaceuticals. The 1,2α-methylene-19-nor-17α-hydroxy-progesterone-acetate (1) for example has an activity in the Clauberg-test when applied orally in infantile rabbits, exceeding all prior art gestation compounds (see table which follows).

With substance (1) the threshold dosage (MacPhail 1.5) is exceeded even with a dosage of 1γ, as compared with a threshold dosage of the non-methylenated 19-nor-17α-hydroxy-progesterone-acetate (2) of 100γ. The cyclopropane ring, therefore, causes an outstanding increase in effectiveness, being at least the hundred-fold of the non-methylenated compound (2).

TABLE

| Substance | Dose (mg./tier) | MacPhail values | Rel. effectiveness referred to 17α-ethinyl-testosterone |
|---|---|---|---|
| (1) 1,2α-Methylene-19-nor-$\Delta^4$-pregnene-17α-ol-3,20-dione-17-acetate | 0.1<br>0.03<br>0.01<br>0.003<br>0.001 | 2.9<br>2.5<br>2.0<br>2.1<br>2.1 | >6,000 |
| (2) 19-Nor-$\Delta^4$-pregnene-17α-ol-3,20-dion-17-acetate | 1.0<br>0.1<br>0.03 | 2.5<br>1.5<br>1.0 | 60 |
| (3) 1,2α-Methylene-6-chlor-$\Delta^{4,6}$-pregnadiene-17α-ol-3,20-dione-17-acetate | 0.03<br>0.01<br>0.003 | 3.5<br>2.7<br>1.1 | 1,500 |
| (4) 6-Chlor-$\Delta^{4,6}$-pregnadiene-17α-ol-3,20-dione-17-acetate | 0.1<br>0.03<br>0.01 | 3.0<br>2.0<br>1.2 | 400 |
| (5) 17α-Ethinyl-19-nor-$\Delta^4$-androstene-17β-ol-3-on-acetate | 0.1<br>0.03<br>0.01 | 1.7<br>1.5<br>1.0 | 200 |

Besides the aforementioned outstanding gestagenic activity, the new compounds according to the present invention have a high ovulation inhibiting effect.

The main field of application of the compounds according to the present invention is in the treatment of the following gynecological disorders: temporary emenorrhea, chronic amenorrhea, endometriosis, glandular-cystic hyperplasia cyclic irregularities, functional infertility, and the like.

Treatment with the new compound is also indicated if conception is to be prevented as, for instance, after serious debilitating diseases.

The new compounds according to the present invention can be applied in combination with other hormones. Addition of an estrogenic compound such as ethinyl-estradiol, for instance, to the compounds of the invention, has proved highly advantageous.

The new steroids can be formulated as pharmaceuticals (medicines) according to the known methods. The active substances are formulated with carriers, taste corrective agents, diluents or other usual additives for obtaining the desired form of use as tablets, pills, dragees, capsules, granules, suspensions, solutions and the like. The concentration of the active substance in the formulated therapeutic agents depends on the form and intended use. Tablets for instance contain preferably 0.1–10 mg. of the active substance and solutions for parenteral injection about 1–20 mg. active substance per ml. of solution.

Tablets for instance may have the following composition:

| | Mg. |
|---|---|
| 1,2α-methylene-19-nor-$\Delta^4$-pregnene-17α-ol-3,20-dione-17-acetate | 1,000 |
| p-Hydroxy-benzoic acid-methyl-ester DAB 6 | 0,011 |
| Lactose DAB 6; U.S.P. XVI | 24,000 |
| Corn (maize) starch DAB 6; U.S.P. XVI | 49,065 |
| Talcum DAB 6; U.S.P. XVI | 4,000 |
| Gelatine, white, DIB 6 | 1,400 |
| Sodium lauryl sulfate U.S.P. XVI | 0,500 |
| p-Hydroxy-benzoic acid-propyl-ester DAB 6, 3rd addition U.S.P. XVI | 0,024 |
| | 80,000 |

The tablets are prepared as usual in a preforming press (diameter: 6 mm., scored; height: 2.0–3.2 mm.; hardness: ca. 4 kg. Stoke's durometer, disintegration in water of 20° C.—ca. 30 seconds). The parenteral application is preferably made in the form of intramuscularly injected oily solutions. Oil solutions for intramuscular injection, for instance, contain per 1 ml. of solution:

2.0 mg. 1,2α-methylene-19-nor-$\Delta^4$ - pregnene - 17α - ol- 3,20-dione-17-acetate
20.0 mg. benzyl-alcohol (B. Ph. C. 1954)
905.9 mg. sesame oil DAB 6

927.9 mg. =1 ml.

The solution is sterilized by Zeiss filtration and drawn off into ampoules under aseptic conditions.

The starting materials for the manufacture of the new compounds according to the present invention can be prepared by the following methods which are known per se and which are illustrated in the examples which follow:

The examples which follow are given to illustrate the novel compounds of the invention, the process of making them, and the preparation of the starting materials used therein. The examples are not to be construed as in any wise limiting the invention.

Example 1

(A) 20.0 g. $\Delta^5$-pregnene-3β,17α-19-triol-20-one-17-acetate (produced according to U.S. Patent 3,065,228 (Syntex)) were hydrogenated in 400 ml. glacial acetic acid in the presence of 1.4 g. platinum dioxide. After consumption of 1 mol equivalent of hydrogen, the hydrogenation was terminated. Following filtering off of the catalyst, the filtrate was evaporated. The residue was taken up with methylene chloride and washed with a solution of NaHCO₃ and water. Thereafter it was dried over sodium sulfate and evaporated to dryness. The residue was recrystallized from glacial acetic ester. The yield of 5α-pregnane-3β-17α-19-triol-20-one-17-acetate having a melting point of 231–233° C. amounted to 9.5 g.

(B) 40.0 g. 5α-pregnane-3β,17α,19-triol-20-one-17-acetate, 440 ml. cyclohexanone and 1.5 l. toluene (abs.) were heated with a solution containing aluminum isopropylate in 210 ml. toluene (abs.) for one hour while slowly distilling off volatilized material. After cooling and washing with dilute sulfuric acid and water, the solution was distilled with steam. Thereafter the aqueous phase was extracted with methylene chloride. After drying over sodium sulfate and evaporating to dryness, the remaining residue was chromatographed on silica gel with methylene chloride with the addition of 10% acetic acid ester. The isolated raw product was crystallized out of methanol.

18.5 g. 5α-pregnane-17α,19-diol-3,20-dione-17-acetate having a melting point of 232.5–234.5° C. were obtained.

(C) 25.0 g. 5α-pregnane-17α-19-diol-3,20-dione-17-acetate were kept for 20 hours at room temperature in 100 ml. abs. pyridine and 50 ml. acetic acid anhydride. Thereafter the solution was stirred into ice water. The precipitate which formed was drawn off with suction, washed and dried. Recrystallization from acetic acid ester resulted in 25.0 g. 5α-pregnane-17α-19-diol-3,20-dione-17,19-diacetate having a melting point of 152–153° C.

(D) There were added to 30.0 g. 5α-pregnane-17α,19-diol-3,20-dione-17,19-diacetate in 250 ml. tetrahydrofuran, 11.09 g. bromine in 98 ml. glacial acetic acid. After decolorizing the reaction solution, it was stirred in ice water. The precipitate thereby formed was drawn off with suction and washed. The washed precipitate was taken up in methylene chloride and dried over sodium sulfate. Following evaporation to dryness, the residue was recrystallized from acetic acid ester. The yield of 2ξ-brom-5α-pregnane-17α,19-diol-3,20-dione-17,19-diacetate having a melting point of 180.5–181.5° C. amounted to 28.3 g.

(E) 26.75 g. 2ξ-brom-5α-pregnane-17α,19-diol-3,20-dione-17,19-diacetate, 12.45 g. calcium carbonate, 6.58 g. lithium bromide and 230 ml. dimethylformamide were heated together for five hours at a tempreature of 115° C. under stirring and in stream of nitrogen. After removing the salts by filtration, the filtrate was stirred into ice water and the precipitate which then formed recovered by suction, washed and dried. The residue was chromatographed on silica gel with methylene chloride. The raw product obtained with recrystallized from isopropyl ether. 10.1 g. of $\Delta^1$-5α-pregnene-17α,19-diol-3,20-dione-17,19-diacetate having a melting point of 157.5–159° C. were recovered.

UV: $\epsilon_{230}$=9830.

(F) 10.0 g. $\Delta^1$-5α-pregnene-17α,19-diol-3,20-dione-17,19-diacetate, 1000 ml. methanol and 500 ml. ion exchange resin (Dowex) in the alkaline form, were stirred for 2.5 hours at room temperature. Thereafter the ion exchange resin was removed by filtration and the filtrate evaporated to dryness. The residue was taken up in methylene chloride, washed with water and dried over sodium sulfate. The residue remaining after evaporation was recrystallized from methanol. The yield of $\Delta^1$-5α-pregnene-17α,19-diol-3,20-dione-17-acetate having a melting point of 263–266° C. came to 6.5 g.

UV: $\epsilon_{230}$=9400.

(G) There were added to 10.0 g. $\Delta^1$-5α-pregnene-17α,19-diol-3,20-dione-17-acetate in 375 ml. pyridine a solution of 30 g. chrom (VI) oxide in 123 ml. water and 245 ml. pyridine. After stirring for 2 hours at 50° C., the reaction solution was diluted with water and extracted with ether. The ether phase was washed with dilute HCl and water and dried over sodium sulfate. After evaporation to dryness, the residue was recrystallized from acetic acid ester. There were recovered 5.4 g. $\Delta^1$-5α-pregnene-17α-ol-3,20-dione-19-al-17-acetate having a melting point of 232–234.5° C.

UV: $\epsilon_{214}$=8200.

(H) 10.25 g. $\Delta^1$-5α-pregnene-17α-ol-3,20-dione-19-al-17-acetate were dissolved in 3.1 liters methanol and mixed with a solution of 31 g. sodium hydroxide in 620 ml. methanol at 0° C. After stirring for 50 minutes at the same temperature, the reaction mixture was neutralized with glacial acetic acid and concentrate in vacuo. The concentrated solution was diluted with water and extracted with methylene chloride. The extract was washed with water and dried over sodium sulfate. The residue remaining after evaporation was chromatographed. Following combining of the corresponding fractions and recrystallization from isopropyl ether 3.2 g. of 19-nor-$\Delta^1$-5α-pregnene-17α-ol-3,20-dione-17-acetate having a melting point of 181.5–184° C. were obtained.

UV: $\epsilon_{230}$=11,100.

(I) 4.6 g. 19-nor-$\Delta^1$-5α-pregnene-17α-ol-3,20-dione-17-acetate and 73 ml. 1 N NaOH were stirred together in 181 ml. methanol under nitrogen and at room temperature for 16 hours. The precipitate which formed during this period was removed with suction, washed with water and dried. On recrystallization from methanol, there were obtained 2.8 g. 19-nor-$\Delta^1$-5α-pregnene-17α-ol-3,20-dione having a melting point of 243–247.5° C.

UV: $\epsilon_{229}$=10,900.

(J) 2.79 g. 19-nor-$\Delta^1$-5α-pregnene-17α-ol-3,20-dione in the form of a solution in 2.33 g. trimethyl-sulfoxonium-iodide and 511 mg. sodium hydride (50% oil suspension) were added to 87 ml. dimethylsulfoxide. After stirring for 75 minutes at room temperature, under nitrogen, the reaction mixture was stirred into ice water, and slightly acidified with acetic acid. The resulting precipitate was sucked off, washed, dissolved in methylene chloride and dried over sodium sulfate. Following evaporation to dryness, the residue was chromatographed on silica gel with methylene chloride. The isolated raw product was recrystallized out of isopropyl ether. There were recovered 950 mg. 1,2α-methylene-19-nor-5α-pregnane-17α-ol-3,20-dione having a melting point of 220.5–222.5° C.

(K) 900 mg. 1,2α-methylene-19-nor-5α-pregnane-17α-ol-3,20-dione were stirred in 18 ml. acetic acid anhydride with 450 mg. p-toluene-sulfonic acid for 20 hours at room temperature. After stirring into ice water pyridine, the precipitate which formed was separated by suction, washed, dissolved in methylene chloride and dried over sodium sulfate. Following evaporation to dryness, the residue was chromatographed with methylene chloride/carbon tetrachloride (3:1). The isolated raw material was recrystallized out of isopropyl ether. The yield of 1,2α-methylene - 19 - nor-5α-pregnane-17α-ol-3,20-dione-17-acetate having a melting point of 229–231° C. came to 510 mg.

(L) 1.3 g. 1,2α-methylene-19-nor-5α-pregnane-17α-ol-3,20-dione were stirred in 15 ml. caproic acid anhydride with 650 mg. p-toluene sulfonic acid for 4 days at 37° C. After steam distillation, the aqueous phase was extracted with methylene chloride and dried over sodium sulfate. After evaporation to dryness and chromatographing over silica gel, 1,2α-methylene-19-nor-5α-pregnane-17α-ol-3,20-dione-17-capronate was obtained as an oil product.

Example 2

1.0 g. 1,2α-methylene-19-nor-5α-pregnane-17α-ol-3,20-dione-17-capronate were refluxed in 50 ml. abs. tert. butanol with 300 mg. selenium dioxide and 0.5 ml. glacial acetic acid for 24 hours. After adding another 300 mg. selenium dioxide, the refluxing was continued for another 24 hours. Thereafter the precipitated selenium was removed by filtration and the filtrate evaporated to dryness. The residue was taken up in acetic acid ester and then washed successively with potassium bicarbonate solution, ammonium sulfide solution, dilute ammonia, dilute hydrochloric acid and water. After drying, evaporation and chromatography on silica gel, there was obtained 1,2α-methylene-19-nor-$\Delta^4$-pregnene - 17α - ol - 3,20-dione-17-capronate in the form of an oil.

UV: $\epsilon_{240}$=12,100.

Example 3

800 mg. 1,2α - methylene-19-nor-5α-pregnane-17α-ol-3,20-dione-17-capronate were refluxed in 25 ml. dioxane with 800 mg. 2,3-dichlor-5,6-dicyan-benzoquinone for 10 hours. Then the reaction mixture was poured with stirring into a sodium bicarbonate solution and extracted with methylene chloride. The resulting extract was washed with water and dried over sodium sulfate. After distilling off the solvent and chromatographing over silica gel, 1,2α-methylene-19-nor - $\Delta^4$ - pregnene-17α-ol-3,20-dione-17-capronate was obtained.

UV: $\epsilon_{240}$=12,200.

Example 4

800 mg. 1,2α - methylene-19-nor-5α-pregnane-17α-ol-3,20-dione-17-capronate were refluxed in 25 ml. dioxan with 1.4 g. 2,3-dichlor-5,6-dicyanbenzoquinone for 17 hours. After working up the reaction mixture as set out in Example 3, 1,2α-methylene-19-nor-$\Delta^{4,6}$-pregnadiene-17α-ol-3,20-dione-17-capronate was obtained in the form of an oil.

UV: $\epsilon_{280}$=19,300.

Example 5

345 mg. 1,2α - methylene-19-nor-5α-pregnane-17α-ol-3,20-dione-17-acetate were refluxed in 11.5 ml. abs. benzene with 2.3 ml. abs. isopropenyl acetate and 34.5 mg. p-toluene sulfonic acid for 4 hours. The reaction mixture was then diluted with benzene, washed with water until neutral and dried over sodium sulfate. After evaporating to dryness, 380 mg. 1,2α-methylene-19-nor-Δ³-5α-pregnene-3,17α-diol-20-one-3,17-diacetate were obtained which could be used as starting material in the following reaction:

To 380 mg. 1,2α-methylene-19-nor-Δ³-5α-pregnene-3,17α-diol-20-one-3,17-diacetate in 15 ml. abs. carbon tetrachloride, there were added 146.5 mg. bromine in 3.8 ml. abs. carbon tetrachloride. Following the decolorizing of the solution, the latter was diluted with methylene chloride, washed with sodium bicarbonate solution and water. The solution was then dried over sodium sulfate and evaporated to dryness in vacuo. There were recovered 410 mg. 4ξ-brom - 1,2α - methylene-19-nor-5α-pregnane-17α-ol-3,20-dione-17-acetate which could be used as starting material for the following reaction:

410 mg. 4ξ-brom-1,2α-methylene-19-nor-5α-pregnane-17α-ol-3,20-dione-17-acetate, 2.5 mg. calcium carbonate, 117 mg. lithium bromide and 10 ml. dimethylformamide were stirred together at 115° C. for five hours under a nitrogen current. Thereafter the salts which had formed were removed by filtration and the filtrate stirred into ice water. The precipitated material was separated by suction, washed and dried. Following purification by preparative thin film chromatography and recrystallization from isopropyl ether, 120 mg. 1,2α-methylene-19-nor-Δ⁴-pregnene-17α-ol-3,20-dione-17-acetate having a melting point of 222–223° C. were obtained.

UV: $\epsilon_{240} = 12{,}300$.

Example 6

850 mg. 1,2-methylene-18-nor-Δ²-pregnene-17α-ol-3,20-dione-17-acetate were refluxed in 25 ml. dioxan with 850 mg. 2,3-dichlor-5,6-dicyanbenzoquinone for 17 hours. The reaction mixture was stirred with saturated sodium bicarbonate solution, extracted with methylene chloride, washed with water and dried over sodium sulfate. After evaporating to dryness, and chromatographing over silica gel, 1,2α-methylene-19-nor-Δ⁴,⁶-pregnadiene-17α-ol-3,20-dione-17-acetate was obtained.

UV: $\epsilon_{281} = 19{,}500$.

Example 7

500 mg. 1,2-α-methylene-19-nor-Δ⁴-pregnene-17α-ol-3,20-dione-17-acetate were refluxed in 25 ml. abs. tert. butanol with 1 g. chloranil for 3 hours with stirring. Thereafter, the undissolved solids were removed by filtering and the solution concentrated as much as possible in vacuo. The remaining residue was taken up in chloroform, washed with a 5% sodium carbonate solution and with water, dried and evaporated in vacuo. After chromatographing on silica gel, 1,2α-methylene-19-nor-Δ⁴,⁶-pregnadiene-17α-ol-3,20-dione-17-acetate was obtained.

Example 8

300 mg. 1,2α-methylene-19-nor-5α-pregnane-17α-ol-3,20-dione-17-acetate in 20 ml. abs. tert. butanol were reacted with 90 mg. selenium dioxide and 0.15 ml. glacial acetic acid and worked up as described in Example 2. 290 mg. raw 1,2α-methylene-19-nor-Δ⁴-pregnene-17α-ol-3,20-dione-17-acetate were obtained. After chromatographing on silica gel and recrystallizing from isopropyl ether/methylene chloride, the pure Δ⁴-compound having a melting point of 221–222.5° C. was obtained, the same being identical with the compound produced according to Example 5.

Example 9

500 mg. 1,2α-methylene-19-nor-Δ⁴-pregnene-17α-ol-3,20-dione-17-acetate were dissolved in 32 ml. tetrahydrofuran. The solution was cooled down to −10 to −20° C., mixed with 3 ml. 1 M sodium methylate solution and stirred for 2 hours at the aforesaid temperature. The reaction mixture was warmed up to 0° C., reacted with saturated ammonium chloride solution and extracted with ether. The dried ether solution was evaporated to provide 1,2α-methylene-19-nor-Δ⁴-pregnene-17α-ol-2,20-dione.

What is claimed is as follows:

1. A compound of the formula $$\begin{array}{c} CH_3 \\ | \\ C=O \\ |---OR \end{array}$$

I wherein R is acyl having from 1 to 11 carbon atoms and $$C_6 {=\!\!=} C_7$$

represents a single bond.

2. A compound according to claim 1 designated 1,2α-methylene - 19 - nor - Δ⁴ - pregnene - 17α - ol - 3,20 - dione-17-capronate.

3. A compound according to claim 1 designated 1,2α-methylene - 19 - nor - Δ⁴ - pregnene - 17α - ol - 3,29 - dione-17-acetate.

4. A therapeutic composition comprising a compound according to claim 1 and an inert carrier in dosage unit form.

5. A therapeutic composition according to claim 4 additionally containing an estrogen.

6. A therapeutic composition according to claim 4 in tablet form containing 0.1–10 mg. of active substance.

7. A therapeutic composition according to claim 4 suitable for use as an injectable containing about 1–20 mg. active substance per ml. of injectable composition.

8. A method of treating gynecological disorders which comprises administering to a subject an effective amount of a composition according to claim 4.

9. A method of inhibiting ovulation which comprises administering to a female subject an effective amount of a composition according to claim 4.

References Cited

UNITED STATES PATENTS

| | | | |
|---|---|---|---|
| 3,127,396 | 3/1964 | Wiechert et al. | 260—239.5 |
| 3,366,653 | 1/1968 | Wiechert et al. | 260—397.4 |

OTHER REFERENCES

Djerassi: Steroid Reactions, p. 249 (1963).

HENRY A. FRENCH, Primary Examiner

U.S. Cl. X.R.

260—397.4